United States Patent [19]
Henrio

[11] Patent Number: 5,382,150
[45] Date of Patent: Jan. 17, 1995

[54] APPARATUS FOR MOLDING A COMPOSITE MATERIAL ARTICLE

[75] Inventor: Philippe Henrio, Lardy, France

[73] Assignee: Societe nationale D'Etude et de Construction de Moteurs D'Aviation, Paris, France

[21] Appl. No.: 214,191

[22] Filed: Mar. 16, 1994

Related U.S. Application Data

[62] Division of Ser. No. 992,466, Dec. 17, 1992, Pat. No. 5,322,661.

[30] Foreign Application Priority Data

Dec. 24, 1991 [FR] France ................. 91 16096

[51] Int. Cl.$^6$ ............... B29C 51/10; B29C 51/28
[52] U.S. Cl. .................... 425/390; 156/382; 425/405.1; 425/415; 425/420
[58] Field of Search ......... 425/388, 389, 390, 405.1, 425/415, 423, 420, 812; 156/382; 264/257, 258, 316, 510

[56] References Cited

U.S. PATENT DOCUMENTS

| | | | |
|---|---|---|---|
| 2,644,985 | 7/1953 | Crandon | 425/405.1 |
| 4,062,917 | 12/1977 | Hill et al. | 425/388 |
| 4,267,142 | 5/1981 | Lankheet | 264/510 |
| 4,562,033 | 12/1985 | Johnson et al. | 264/510 |
| 4,608,220 | 8/1986 | Caldwell et al. | 425/389 |
| 4,683,018 | 7/1987 | Sutcliffe et al. | 264/257 |
| 4,824,631 | 4/1989 | Yeager | 264/257 |
| 5,059,377 | 10/1991 | Ashton et al. | 425/405.1 |
| 5,078,938 | 1/1992 | Munk et al. | 425/420 |
| 5,122,176 | 6/1992 | Goettler | 264/510 |

FOREIGN PATENT DOCUMENTS

| | | | |
|---|---|---|---|
| 2459118 | 1/1981 | France. | |
| 2526011 | 11/1982 | France. | |
| 61-132310 | 6/1986 | Japan | 264/257 |
| 2184053 | 6/1987 | United Kingdom | 425/405.1 |
| WO89/03293 | 4/1989 | WIPO | 425/405.1 |

OTHER PUBLICATIONS

*Mold Making Handbook*, Klaus Stoeckhart, McMillan Pub. Co. (1983).

Primary Examiner—Jay H. Woo
Assistant Examiner—Robert B. Davis
Attorney, Agent, or Firm—Bacon & Thomas

[57] ABSTRACT

A method and apparatus of molding articles from composite materials are disclosed in which a stack of prepregs are placed on a first forming surface of a former, which forming surface has a surface configuration matching that of one side of the composite article, placing a semi-rigid molding shelf onto the former such that a second forming surface of the molding shell, which matches the surface configuration of an opposite side of the composite article, bears against the stack of prepregs and urging the molding shell towards the former, thereby compressing the plies of prepregs by drawing a vacuum between an impermeable membrane covering the molding shell and the former. The assembly of the former, the molding shell, the stack of prepregs and the impermeable membrane are placed in an autoclave such that it may be heated while the vacuum is drawn between the membrane and the former to compress the stack of plies of prepregs.

6 Claims, 2 Drawing Sheets 5,382,150

APPARATUS FOR MOLDING A COMPOSITE MATERIAL ARTICLE

This application is a division of application Ser. No. 07/992,466, filed Dec. 17, 1992 and now U.S. Pat. No. 4,322,661.

BACKGROUND OF THE INVENTION

The present invention relates to a method and apparatus for molding a composite material article, more particularly such an article having opposite sides with differing surface configurations.

Techniques are well known for forming articles from composite materials whereby plies of pre-impregnated sheets, or prepregs, are stacked between a forming surface and gas-impermeable membrane. The article is formed by heating this assembly in an autoclave, while at the same time evacuating gases out to the volume enclosed by the membrane.

U.S. Pat. No. 4,562,033 describes a method for manufacturing articles from a composite material wherein a stack of prepregs are placed on a former having a forming surface and then are covered by a microporous film as well as a gas-impermeable membrane. A vacuum is drawn between the membrane and the former and the assembly is heated to first de-gas the resin of the composite material, and then to subsequently cure the composite material. The curing takes place at atmospheric pressure. This technique has been found to be suited for composite material parts in which the opposite sides have identical configurations.

U.S. Pat. No. 4,683,018 describes a method and apparatus for shaping composite material parts. Initially, the prepreg layers are separated by release films and the assembly is subjected to partial curing while interposed between two shaped formers. Pressure is exerted onto the stack of layers by a press acting on one of the formers. Following the partial curing, the layers are removed from between the formers, the release layers removed from the stack and the stack is subjected to a final curing operation by placing it between a former and an impermeable membrane, placing the assembly in an autoclave and curing the resin. Again, this technique has been found to be suited for the manufacture of composite material articles having opposite sides with the same surface configuration.

French Patents 2,526,011 and 2,459,118 also illustrate typical examples of the known techniques wherein a stack of prepregs is interposed between a forming surface and a flexible membrane which exerts a compressing force on the prepregs during the curing of the resin.

The techniques disclosed by the above patents form composite material parts by curing the stack of prepregs in an autoclave in which the pressure compacting the laminate is isostatic. One of the drawbacks of these known techniques is that the use of additional layers, such as environmental products, plastic films, glass felts and other fabrics between the stack of prepregs and the impermeable membrane allows the accurate forming of only the surface which is in contact with the forming surface of the former. Such techniques are suitable for composite material parts which have opposite surfaces of the same configuration, in which the surfaces are separated by a generally constant thickness of the composite material. Accordingly, these techniques cannot be utilized to manufacture composite material articles which have opposite sides of differing surface configurations, such as fan blades.

Other techniques involve the stacking of the prepreg plies in a mold and compressing the stack between mold portions by a press, or the like in which curing takes place in the press. This technique transmits axial stresses to the stack of prepregs, thereby resulting in-a composite material article which is less than completely satisfactory.

SUMMARY OF THE INVENTION

A method and apparatus of molding articles from composite materials are disclosed in which a stack of prepregs are placed on a first forming surface of a former, which forming surface has a surface configuration matching that of one side of the composite article, placing a semi-rigid molding shell onto the former such that a second forming surface of the molding shell which matches the surface configuration of an opposite side of the composite article, bears against the stack of prepregs and urges the molding shell towards the former, thereby compressing the plies of prepregs by drawing a vacuum between an impermeable membrane covering the molding shell and the former.

The molding shell defines degassing vents which enables the gas generated by the prepregs during their curing to be removed from within the molding shell. In order to improve the accuracy of the formed surfaces, the rigidity of the molding shell may be increased by placing braces on an outer surface and by reinforcing a peripheral edge of a skirt portion of the molding shell which receives a portion of the former.

The assembly of the former, the molding shell, the stack of prepregs and the impermeable membrane are placed in an autoclave such that it may be heated while the vacuum is drawn between the membrane and the former to compress the stack of plies of prepregs. The method and apparatus according to this invention enables composite articles to be manufactured having opposite sides of differing surface configurations, such as fan blades. The molding shell comprises a rigid material, the article can easily be manufactured with close dimensional tolerances and accurate surface configurations, since the compacting pressure is applied uniformly over the opposite surfaces of the article.

DETAILED DESCRIPTION OF THE PREFERRED EMBODIMENT

Figure 1:
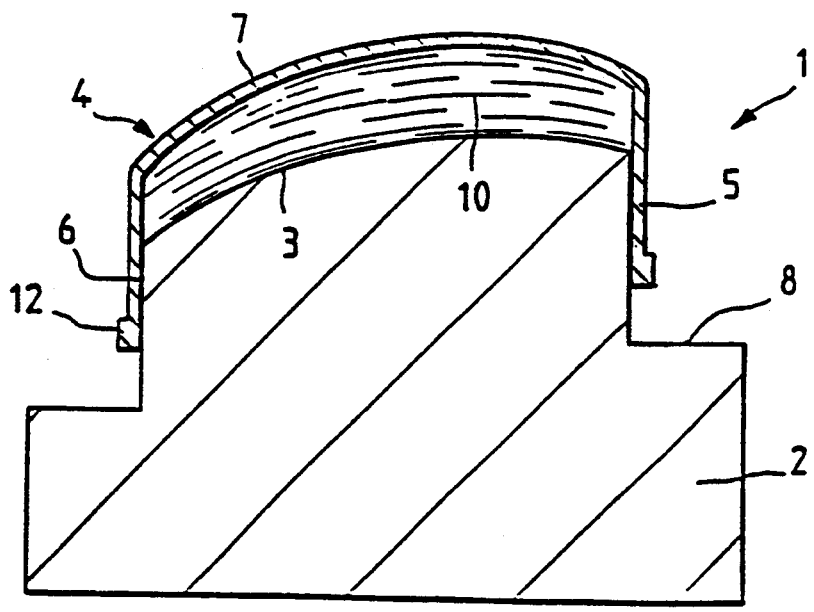
FIG. 1 is a cross-sectional view of the apparatus according to the invention before the stack of prepregs have been compressed.
Figure 2:
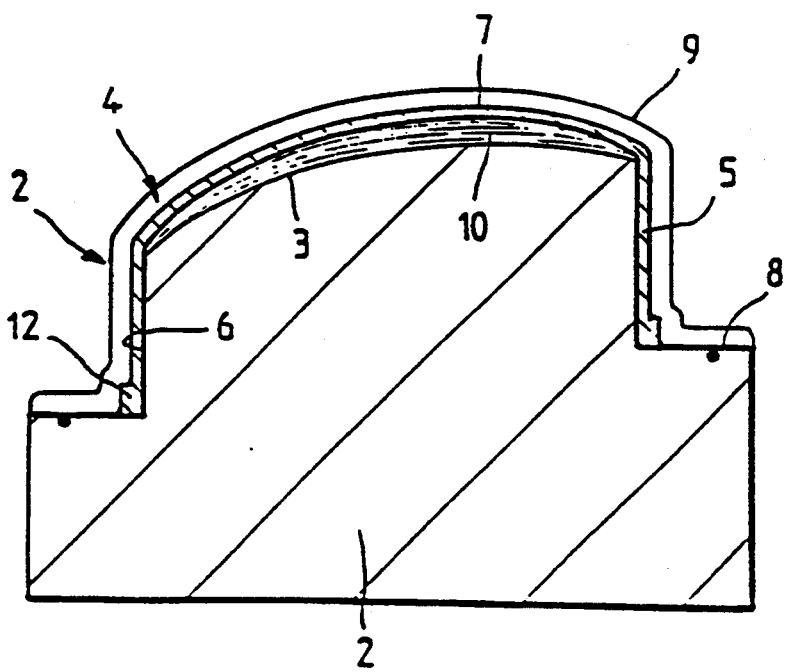
FIG. 2 is a cross-sectional view, similar to FIG. 1, illustrating the apparatus according to the invention following compression of the plies of prepregs.

The present invention relates to a method and apparatus used in manufacturing composite material articles having differing surface configurations on opposite sides, in particular a fan blade, using an autoclave baking procedure.

The apparatus 1 according to the present invention comprises a former 2 having a portion defining a first forming surface 3 which matches the surface configuration of one side of the finished composite article, and a semi-rigid molding shell 4 which has a skirt 5 adapted to slidably receive a portion of the former 2 therein. Skirt 5 is sized so as to accommodate the portion of the former 2 defined by sidewalls 6 such that the molding shell 4 may move with respect to the former 2. The shell 4 has an upper wall 7 which defines a second forming surface having a configuration different from that of the first forming surface 3, but which matches an opposite side of the composite article to be formed. Former 2 also defines a base portion 8 which, in known fashion, enables a gas-impermeable membrane 9 to be attached to the former 2 in a sealing manner.

The former 2 and the molding shell 4 are fabricated from material with a coefficient of thermal expansion substantially equal to that of the article to be manufactured, such as carbon-epoxy composite material. As a result, the molding shell 4 has an upper wall 7 which is both very thin in order to transmit the pressure to the stack of prepregs, and also very rigid to achieve the accurate formation of the side of the article which comes in contact with the forming surface of wall 7. The use of such composite material renders the apparatus 1 lightweight and economical. In an illustrative embodiment, the average thickness of the upper wall 7 may be approximately 0.5 min.

As illustrated in FIG. 1, the stack of plies of prepregs 10 are placed on the first forming surface 3 defined by the former 2. The thickness of the plies 10 and the stacking orientation are selected such that the finished article shall be within the desired final dimensional tolerances. Following the stacking of the prepreg plies on the first forming surface 3, the molding shell 4 is placed on the former 2 such that its second forming surface formed on wall 7 contacts the uppermost portion of the prepreg plies 10. The height of the skirt portion 5 is selected such that the molding shell 4 may cover the upper portion of the former 2 to prevent any slippage and/or leakage of the material to be compacted.

Figure 3:
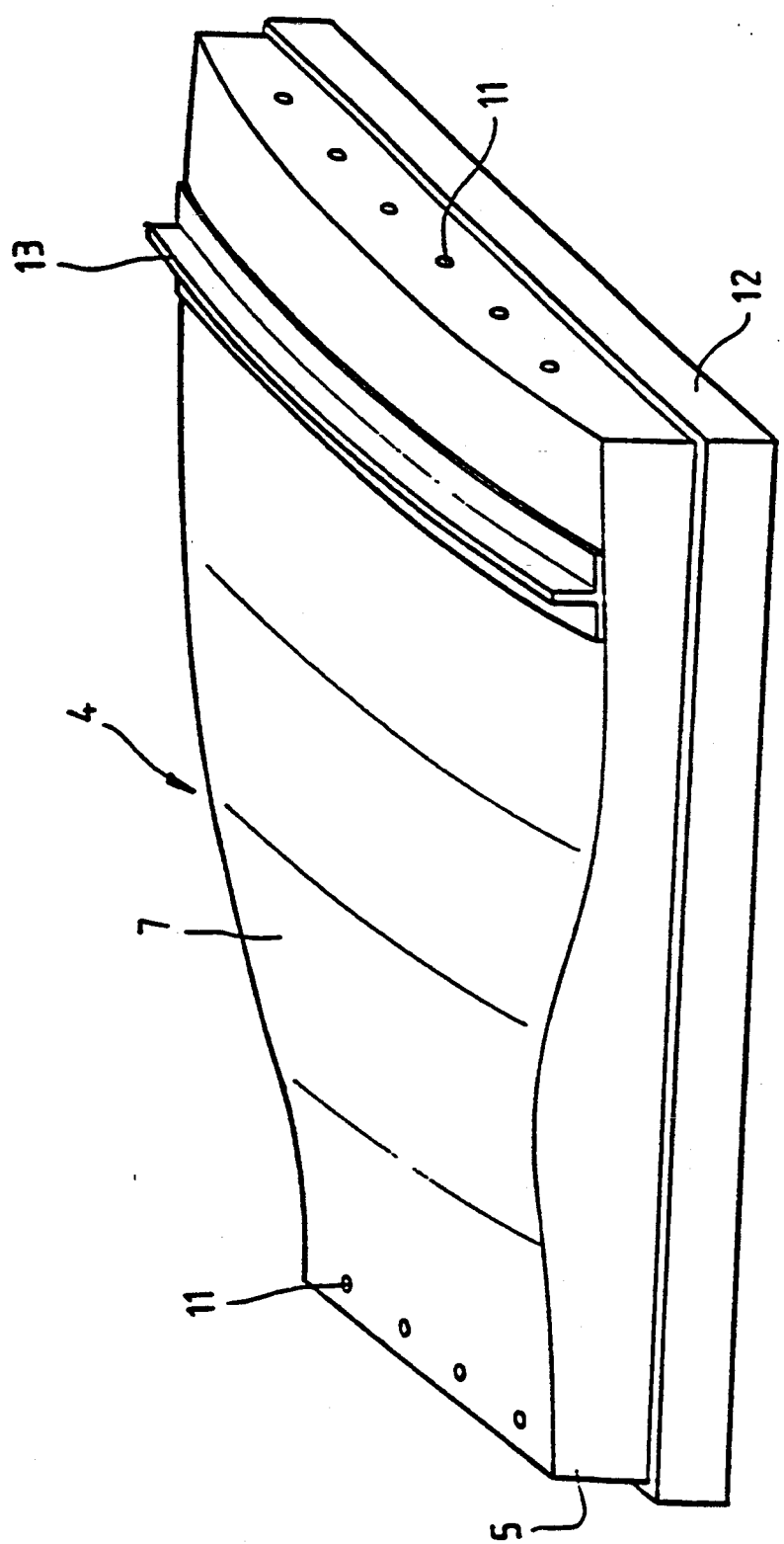
FIG. 3 is a perspective view of the apparatus according to the present invention.

Next, a gas-impermeable membrane 9 is tightly affixed to and sealed against the base 8 of the former 2 in known fashion such that the membrane 9 covers molding shell 4. This assembly is placed into an autoclave and known means are attached to the membrane 9 or the former 2 to draw a vacuum between the membrane and the former. The reduction of pressure within the membrane causes the membrane to urge the molding shell 4 downwardly due to the pressure inside the autoclave acting on an outer surface of the membrane 9. Such pressure causes molding shell 4 to slide downwardly with respect to the former 2, thereby compressing the stack of prepregs between the first and second forming surfaces. As illustrated in FIG. 3, the molding shell may define a plurality of degassing vents 11 to enable the evacuation of the gases from within the molding shell 4 which emanate from the stack of prepregs 10 during the curing process.

The lower periphery 12 of the skirt 5 is reinforced to prevent the molding shell 4 from opening under the application of pressure from the gas impermeable membrane 9. To further increase the rigidity of the molding shell 4, a brace member 13 may be attached to the upper surface of wall 7 as illustrated in FIG. 3. The rigidity of the molding shell 4 increases the accuracy with which the second forming surface forms the opposite side of the composite article.

During the curing process, pressure inside the autoclave is uniformly applied to the entire outside surface of the molding shell 4 via the gas impermeable, flexible membrane 9. The stack of prepregs 10 may be compressed to approximately ⅓ of its initial thickness. Obviously, the height of the sidewalls 6 of the former 2 must be sufficient to allow the molding shell 4 to slide downwardly a sufficient amount to properly compress the stack of prepregs. Following the curing of the stack of prepregs, and the disassembly of the gas impermeable membrane and the molding shell 4 from the former 2, the composite article may be removed from the former 2. Due to the rigidity of the molding shell 4 and the former 2, as well as the uniform application pressure, the molded composite article, in many cases, need only undergo minor deburring in order to be completed.

The foregoing description is provided for illustrative purposes only and should not be construed as in any way limiting this invention, the scope of which is defined solely by the appended claims.

I claim:

1. Apparatus for molding an article from composite material wherein the article has opposite sides with different surface configurations comprising:
   a) former having a first forming surface with a configuration matching one of the sides of the article, the first surface adapted to receive a stack of plies of prepregs thereon;
   b) a semi-rigid molding shell having a second forming surface with a configuration different from the first forming surface so as to match the configuration of the opposite side of the article operatively associated with the former such that the second forming surface is located so as to contact a stack of plies of prepregs on the former, the molding shell having an upper surface further comprising bracing means located on the upper surface; and
   c) a flexible gas-impermeable member operatively associated with the former so as to cover the molding shell such that, when a vacuum is drawn between the flexible impermeable member and the former, the stack of plies of prepregs is compressed between the first and second forming surfaces.

2. (Amended) The apparatus of claim 1 wherein the molding shell has a skirt adapted to slidably receive a portion of the former therein.

3. The apparatus of claim 2 wherein the skirt has a reinforced peripheral edge portion.

4. The apparatus of claim 1 wherein the molding shell has a plurality of degassing vents.

5. The apparatus of claim 1 wherein the former is formed of a carbon-epoxy composite material.

6. The apparatus of claim 1 wherein the molding shell is formed of a carbon-epoxy composite material.

* * * * *